United States Patent
Esparza et al.

(10) Patent No.: US 8,601,941 B2
(45) Date of Patent: Dec. 10, 2013

(54) FOOD TRAY, INSERT AND METHOD

(75) Inventors: Fernando Esparza, Oswego, IL (US);
Tim Traylor, Bolingbrook, IL (US)

(73) Assignee: Restaurant Technology, Inc., Oak Brook, IL (US)

( * ) Notice: Subject to any disclaimer, the term of this patent is extended or adjusted under 35 U.S.C. 154(b) by 1232 days.

(21) Appl. No.: 11/473,439

(22) Filed: Jun. 23, 2006

(65) Prior Publication Data
US 2007/0295325 A1    Dec. 27, 2007

(51) Int. Cl.
*A47J 37/07* (2006.01)
*A21B 3/15* (2006.01)
*A47J 37/06* (2006.01)

(52) U.S. Cl.
CPC ............ *A21B 3/155* (2013.01); *A47J 37/067* (2013.01); *A47J 37/0704* (2013.01)
USPC .............................. 99/450; 219/392; 426/418

(58) Field of Classification Search
USPC .................... 99/483, 448, 468; 219/395, 521; 426/523, 418
See application file for complete search history.

(56) References Cited

U.S. PATENT DOCUMENTS

| | | | |
|---|---|---|---|
| 466,416 A * | 1/1892 | Hunt | 220/4.21 |
| 2,204,681 A * | 6/1940 | Kircher | 99/340 |
| 2,732,696 A * | 1/1956 | Baker | 99/446 |
| 3,130,288 A * | 4/1964 | Monaco et al. | 219/385 |
| 4,870,233 A * | 9/1989 | McDonald et al. | 219/730 |
| 5,549,040 A | 8/1996 | Naramura | |
| 5,590,586 A | 1/1997 | Ulfig et al. | |
| 5,724,886 A | 3/1998 | Ewald et al. | |
| 5,783,803 A | 7/1998 | Robards, Jr. | |
| 5,900,173 A | 5/1999 | Robards, Jr. | |
| 5,947,012 A | 9/1999 | Ewald et al. | |
| 5,948,301 A | 9/1999 | Liebermann | |
| 6,011,243 A | 1/2000 | Arnold et al. | |
| 6,116,154 A | 9/2000 | Vaseloff | |
| 6,119,587 A | 9/2000 | Ewald et al. | |
| 6,175,099 B1 | 1/2001 | Shei et al. | |
| 6,209,447 B1 | 4/2001 | Ewald et al. | |
| 6,262,394 B1 | 7/2001 | Shei et al. | |
| 6,265,695 B1 | 7/2001 | Liebermann | |
| 6,358,548 B1 * | 3/2002 | Ewald et al. | 426/418 |
| 6,384,380 B1 | 5/2002 | Faries, Jr. et al. | |
| 6,384,381 B2 | 5/2002 | Witt et al. | |
| 6,412,403 B1 | 7/2002 | Veltrop | |
| 6,541,739 B2 | 4/2003 | Shei et al. | |
| 6,607,766 B2 * | 8/2003 | Ewald et al. | 426/418 |
| 6,637,322 B2 | 10/2003 | Veltrop | |
| 6,658,994 B1 | 12/2003 | McMillan | |
| 6,878,391 B2 | 4/2005 | Veltrop | |
| 6,884,451 B2 | 4/2005 | Veltrop | |
| 2001/0007322 A1 | 7/2001 | Shei et al. | |
| 2002/0012729 A1 | 1/2002 | Ewald et al. | |
| 2002/0100756 A1 | 8/2002 | Veltrop | |
| 2002/0121509 A1 | 9/2002 | Shei et al. | |
| 2002/0172742 A1 | 11/2002 | Veltrop | |

(Continued)

*Primary Examiner* — Tu B Hoang
*Assistant Examiner* — Thien S Tran
(74) *Attorney, Agent, or Firm* — Ryndak & Suri LLP

(57) ABSTRACT

A food tray and tray insert are provided that are particularly adapted for use in a heated food holding compartment. Methods of storing cooked food are also provided using such devices. The devices and use thereof allows cooked food such as hamburger patties to be stored at elevated temperatures for extended periods of time without a significant deleterious effect on the organoleptic properties of the cooked food.

24 Claims, 8 Drawing Sheets

(56) References Cited

U.S. PATENT DOCUMENTS

2002/0189205 A1* 12/2002 Hart et al. .................. 53/447
2003/0118706 A1 6/2003 Veltrop
2004/0033297 A1* 2/2004 Lee et al. .................. 426/418

* cited by examiner

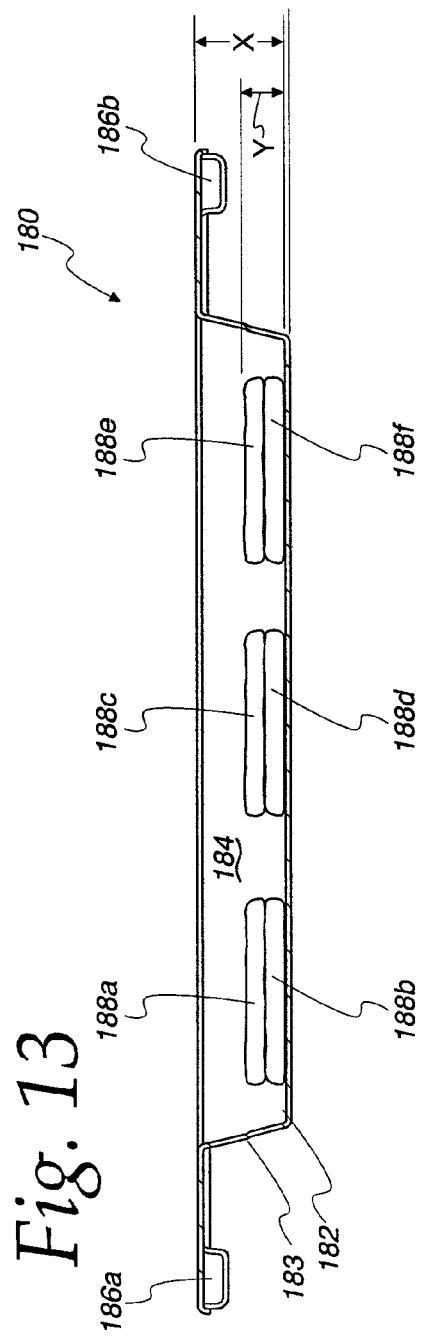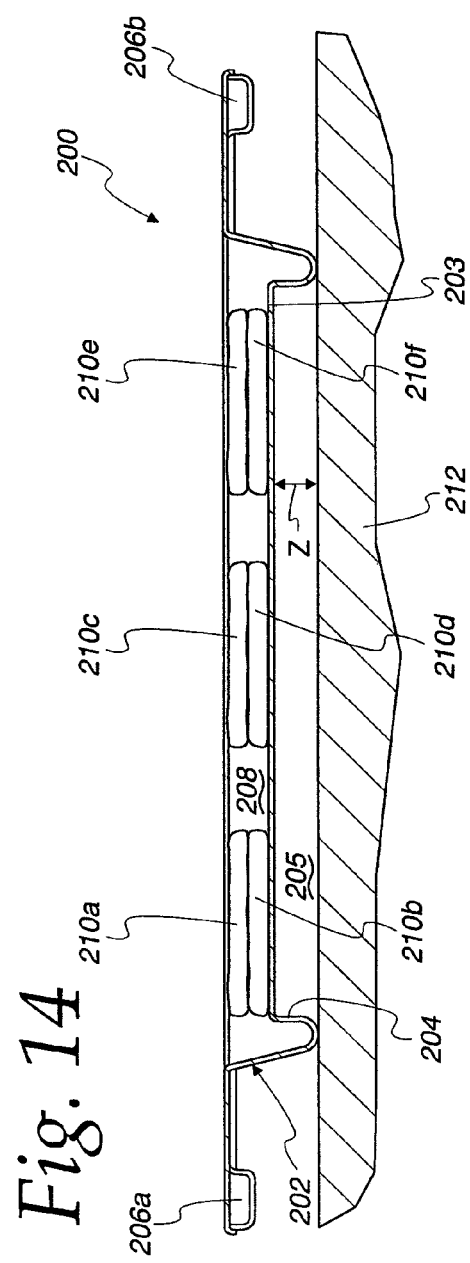

FOOD TRAY, INSERT AND METHOD

FIELD OF THE INVENTION

The present invention relates to a food tray and a tray insert adapted to be removably located in a food holding compartment that may be used to keep food heated or cooled for an extended period of time and associated methods of using such devices.

BACKGROUND OF THE INVENTION

Many quick-service restaurants must prepare a high volume of food relatively quickly. These restaurants face a number of conflicting factors when striving to efficiently provide fast, palatable, and safe food. Customers expect to receive their food quickly and with predictable and constant high quality. Moreover, the rate of customer demand varies over time, with some periods, such as lunch and dinner times, having extremely high rates of customer demand. However, the kitchens of many quick-service restaurants are of limited size and/or production capacity and have a limited number of cooking devices.

To meet the often competing factors of quick service while producing a consistently high quality product, it is advantageous for one individual to cook a relatively substantial amount of food product in bulk and store the cooked food product in food trays while another individual food preparer transfers food from the trays to a sandwich bun or individual portion sized container to fill customer orders. Typical food products that are of most interest to have readily available for food preparers include sandwich fillings such as hamburger patties, chicken patties, breaded chicken patties, breaded fish fillets, Canadian bacon, pork sausage, and eggs, for example.

Because these prepared food products are not being served immediately upon preparation, it is critical to store the food product so as to maximize potential storage time while optimally maintaining the appearance, taste, temperature, and texture of the food product, as well as minimizing bacterial contamination of the stored food product.

In view of the foregoing, there exists a need for an improved food tray, tray insert, and a method of using the food tray and tray insert that provides longer storage times and optimizes, without significant adverse effects, the appearance, taste, temperature and texture of the pre-cooked food products, as well as minimizes bacterial contamination of such stored food products. Additionally, a need also exists for a food staging device that promotes efficient food handling and use of space within the kitchen of a quick-service restaurant.

SUMMARY OF THE INVENTION

In accordance with the present invention, an improved food tray and method for use thereof, typically in connection with a compartment, and preferably in a heated pass-through compartment, for holding ready-to-serve food product is provided. When used in combination with a compartment of desirable configuration, the food tray is particularly useful for storing over an extended period of time cooked sandwich fillings such as, for example, hamburger patties, fish fillets, Canadian bacon, pork sausage, eggs, and chicken patties, chicken fillets as well as other types of food, including chicken nuggets, biscuits, muffins, and hotcakes. The appearance, taste, temperature and texture of the stored food items may be maintained over extended storage periods while also minimizing risk of bacterial contamination.

In one aspect of the invention, a food tray is provided which is adapted to store individual portions of food over extended storage periods within a storage compartment. The food tray includes a tray body and a tray insert. The tray body includes a first end, a second end, a lower surface tray bottom, and a sidewall structure. The tray bottom and sidewall structure define a tray volume or cavity for the food tray within which a tray insert can be added and within which food product can be stored. The tray insert is positionable within the tray volume and includes an elongated supporting surface and insert supports. The supporting surface and insert supports define a tray insert height wherein the supporting surface is above the tray bottom lower surface and is below the top of the sidewall structure. The lower surface defines a volume between the lower surface and the supporting surface. The supporting surface defines a food holding volume in conjunction with the sidewall structure.

The tray insert is positioned within the food tray leaving only a small gap between the sidewall structure and the supporting surface. While the gap can be as desired, preferably, the gap is less than approximately 0.1 inch, where the tray insert is a functional fit within the food tray. The sidewall structure of the food tray can be any suitable height. The sidewall height can be as desired and preferably, the sidewall structure is approximately 2.125 inches high. The height between the tray bottom and the supporting surface typically can be between approximately 10% and 80% of the overall height of the sidewall structure. For example, the tray insert height can be approximately one inch less than the tray height, where the tray height is the overall height of the sidewall structure. Typically, the height between the tray bottom and the supporting surface is approximately 50% of the overall height of the sidewall structure.

In accordance with another aspect of the invention, the supporting surface is a generally flat surface and comprises a plurality of apertures thereon. The apertures can be any shape or size. Typically, the apertures are arrayed in a generally overall circular shape which overall circular shape corresponds generally to the diameter of hamburger patties to be stored thereon. The apertures can be any shape or size as appropriate for the cooked food that will be stored on the supporting surface. For example, the individual apertures can be slits, generally oblong, rectangular, triangular, or circular. Typically, the individual apertures are generally rectangular, triangular, or circular.

In accordance with another aspect of the invention, hamburger patties are stacked two patties high on the supporting surface. Typically, eight hamburger patties that are weighted ten hamburger patties per pound of meat are stacked two patties high on the supporting surface. Typically, six hamburger patties that are weighted four hamburger patties per pound of meat are stacked two patties high on the supporting surface.

In accordance with another aspect of the invention, the supporting surface comprises a plurality of apertures that form a generally circular shape generally corresponding to the size of hamburger patties to be stored thereon. The supporting surface may contain any number of generally circular shaped series of apertures as appropriate. Typically, the supporting surface has three generally circular shaped series of apertures. Typically, at least one cooked hamburger patty essentially covers the circular shaped series of apertures. Preferably, the food tray comprises a plurality of cooked hamburger patties contained in the tray on the supporting surface and essentially covering the apertures.

In accordance with another aspect of the present invention, a food tray is provided which is adapted to store individual portions of food over extended storage periods within a storage compartment. A tray insert is provided that is an integral part of the tray body. The tray insert comprises a supporting surface. The supporting surface is located above the tray bottom lower surface and below the top of the sidewall structure. The supporting surface and lower surface define a volume, wherein the volume is a sealed void.

In accordance with another aspect of the present invention, a method of storing food, preferably cooked food, within a food tray in a heated compartment is provided. Preferably, the heated compartment is a pass-through compartment having a passageway which extends from an opening on one end of the heated compartment to an opening on an opposite end of the heated compartment.

A food tray is provided which is adapted to store individual portions of food over extended storage periods within a storage compartment. The food tray includes a tray body and a tray insert. The tray body includes a first end, a second end, a lower surface tray bottom, and a sidewall structure. The tray bottom and sidewall structure define a tray volume or cavity for the food tray within which a tray insert can be added and within which food product can be stored. The tray insert is positionable within the tray volume and includes an elongated supporting surface and insert supports. The supporting surface and insert supports define a tray insert height wherein the supporting surface is above the tray bottom lower surface and is below the top of the sidewall structure. The lower surface defines a volume between the lower surface and the supporting surface. The supporting surface defines a food holding volume in conjunction with the sidewall structure. Individual portions of food, such as, for example, hamburger patties, fish fillets, Canadian bacon, pork sausage, eggs, and chicken patties, chicken fillets as well as other types of food, including chicken nuggets, biscuits, muffins, and hotcakes, are placed on the supporting surface. The food tray having the individual portions of food stored therein is placed and stored for a period of time in a heated compartment having an upper compartment surface and a heated lower compartment surface to maintain the temperature of the cooked food products in a desired elevated storage temperature range, wherein the supporting surface is elevated above the heated lower compartment surface. The food tray is maintained during storage so that the top edge of the tray is in close proximity to the upper compartment surface to achieve a gap between the top of the tray and the upper compartment surface of between about 0 and 0.25 inches.

Preferably, the lower volume avoids significant convection heat transfer between said heated lower compartment surface and said individual portions of food. Preferably, the gap is sufficiently sized to restrict water vapor from evaporating from the cooked food in the tray during storage in the compartment.

Typically, the supporting surface is a generally flat surface and may comprise a plurality of apertures thereon. The apertures can be any shape or size. Typically, the apertures are arrayed in a generally overall circular shape which overall circular shape corresponds generally to the diameter of hamburger patties to be stored thereon. The apertures can be any shape or size as appropriate for the cooked food that will be stored on the supporting surface. For example, the individual apertures can be slits, generally oblong, oval, rectangular, triangular, or circular. Typically, the individual apertures are generally rectangular, triangular, or circular.

In accordance with another aspect of the present invention, a method of storing previously cooked hamburger patties after cooking and before incorporation into a hamburger sandwich within a food tray in a heated compartment is provided. Preferably, the heated compartment is a pass-through compartment having a passageway which extends from an opening on one end of the heated compartment to an opening on an opposite end of the heated compartment.

A food tray is provided which is adapted to store individual portions of food over extended storage periods within a storage compartment. The food tray includes a tray body and a tray insert. The tray body includes a first end, a second end, a lower surface tray bottom, and a sidewall structure. The tray bottom and sidewall structure define a tray volume or cavity for the food tray within which a tray insert can be added and within which food product can be stored. The tray insert is positionable within the tray volume and includes an elongated supporting surface and insert supports. The supporting surface and insert supports define a tray insert height wherein the supporting surface is above the tray bottom lower surface and is below the top of the sidewall structure. The lower surface defines a volume between the lower surface and the supporting surface. The supporting surface defines a food holding volume in conjunction with the sidewall structure. Individual portions of food, such as hamburger patties, are placed on the supporting surface. The food tray having the individual portions of food stored therein is placed and stored for a period of time in a heated compartment having an upper compartment surface and a heated lower compartment surface to maintain the temperature of the cooked food products in a desired elevated storage temperature range, wherein the supporting surface is elevated above the heated lower compartment surface. Typically, the cooked hamburger patties are maintained at a storage temperature of approximately 145° F. The food tray is maintained during storage so that the top edge of the tray is in close proximity to the upper compartment surface to achieve a gap between the top of the tray and the upper compartment surface of between about 0 and 0.25 inches to restrict water vapor from evaporating from the cooked hamburger patties in the tray during storage in the compartment.

Preferably, the lower volume avoids significant convection heat transfer between said heated lower compartment surface and said individual portions of food. Preferably, the gap is sufficiently sized to restrict water vapor from evaporating from the cooked food in the tray during storage in the compartment.

Typically, the supporting surface is a generally flat surface and may comprise a plurality of apertures thereon. The apertures can be any shape or size. Typically, the apertures are arrayed in a generally overall circular shape which overall circular shape corresponds generally to the diameter of hamburger patties to be stored thereon. The apertures can be any shape or size as appropriate for the cooked food that will be stored on the supporting surface. For example, the individual apertures can be slits, generally oblong, oval, rectangular, triangular, or circular. Typically, the individual apertures are generally rectangular, triangular, or circular.

Typically, the method of storing previously cooked hamburger patties after cooking and before incorporation into a hamburger sandwich within a food tray in a heated compartment further comprises storing the hamburger patties in the food tray until the hamburger patties are assembled into hamburger sandwiches. Preferably, hamburger patties are stacked on the supporting surface two hamburger patties high. Typically, either six or eight hamburger patties are stored on the supporting surface in the food tray.

In accordance with another aspect of the present invention, a method of making a hamburger sandwich is provided. A plurality of hamburger patties are cooked. A food tray is provided which is adapted to store individual portions of food over extended storage periods within a storage compartment.

The food tray includes a tray body and a tray insert. The tray body includes a first end, a second end, a lower surface tray bottom, and a sidewall structure. The tray bottom and sidewall structure define a tray volume or cavity for the food tray within which a tray insert can be added and within which food product can be stored. The tray insert is positionable within the tray volume and includes an elongated supporting surface and insert supports. The supporting surface and insert supports define a tray insert height wherein the supporting surface is above the tray bottom lower surface and is below the top of the sidewall structure. The lower surface defines a volume between the lower surface and the supporting surface. The supporting surface defines a food holding volume in conjunction with the sidewall structure. Individual portions of food, such as previously cooked hamburger patties are placed on the supporting surface. The food tray having the individual portions of food stored therein is placed and stored for a period of time into a heated compartment having an upper compartment surface and a heated lower compartment surface to maintain the temperature of the cooked food products in a desired elevated storage temperature range, wherein the supporting surface is elevated above the heated lower compartment surface. Typically, the cooked hamburger patties are maintained at a storage temperature of approximately 145° F. The food tray is maintained during storage so that the top edge of the tray is in close proximity to the upper compartment surface to achieve a gap between the top of the tray and the upper compartment surface of between about 0 and 0.25 inches to restrict water vapor from evaporating from the cooked hamburger patties in the tray during storage in the compartment. Thereafter, the cooked hamburger patties are removed from the tray when needed for assembly into hamburger sandwiches and the hamburger patties are assembled into hamburger sandwiches.

Typically, assembling the hamburger patties into sandwiches comprises applying condiments and placing the hamburger patties into buns.

The supporting surface may comprise a plurality of apertures which may be any potential shape, such as ovals, circles, slits, or rectangles. Typically, the apertures are arranged in a generally circular shape, such that hamburger patties essentially cover the apertures.

Typically, hamburger patties are stored on the supporting surface two hamburger patties high. Any number of hamburger patties can be stored in the food tray. Typically, six or eight hamburger patties are stored on the supporting surface of the food tray.

BRIEF DESCRIPTION OF THE FIGURES

The accompanying drawings form part of the specification and like numerals are employed to designate like parts throughout the same.

FIG. 13 is a side elevation view of another embodiment of the tray in accordance with the invention.

FIG. 14 is a side elevation view of another embodiment of the tray in accordance with the invention.

DETAILED DESCRIPTION OF THE INVENTION

Figure 1:
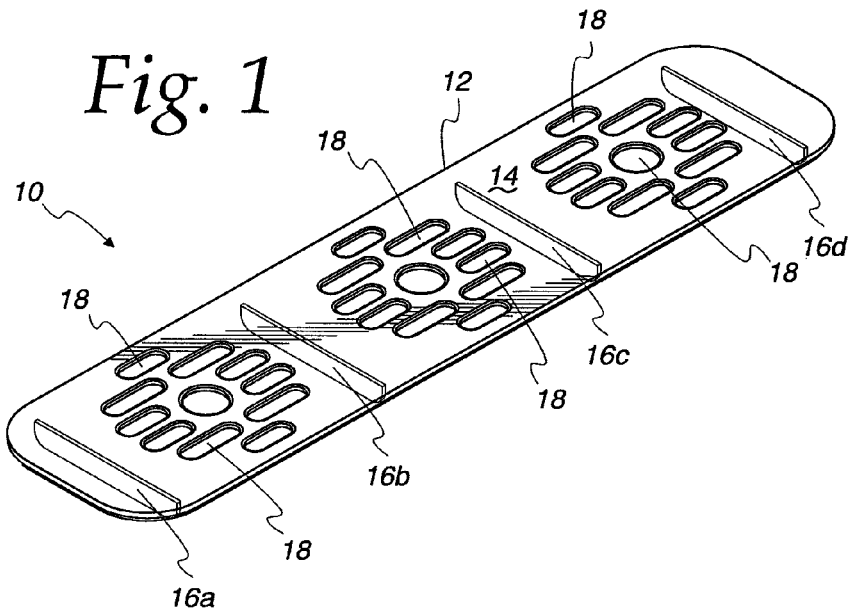
FIG. 1 is a perspective view of an embodiment of the tray insert in accordance with the invention.

While this invention is susceptible of embodiment in many different forms, there is shown in the drawings and described in detail herein, several specific embodiments with the understanding that the present disclosure is to be considered as exemplifications of the principles of the invention and is not intended to limit the invention to the embodiments illustrated.

U.S. Pat. Nos. 5,590,586, 5,724,886, 5,947,012, 6,119,587, 6,209,447, 6,358,548 and 6,607,766 are hereby expressly incorporated by reference.

Referring to the figures generally, and in particular to FIG. 1, a tray insert 10 according to the present invention is shown generally as having a tray insert body 12. Tray body 12 comprises a supporting surface 14 and a plurality of insert supports 16a-d. Insert supports 16a-d give tray insert 10 height. Supporting surface 14 is a generally flat surface. Supporting surface 14 further comprises a plurality of apertures 18 to form a generally circular shape generally corresponding to the size of cooked food portions to be stored thereon. Apertures 18 can be any shape, size, or number as appropriate for the cooked food that will be stored on supporting surface 14. Typically, apertures 18 define a total void space opening of at least 30%. More typically, apertures 18 define a total void space opening of at least 50%.

Figure 2:
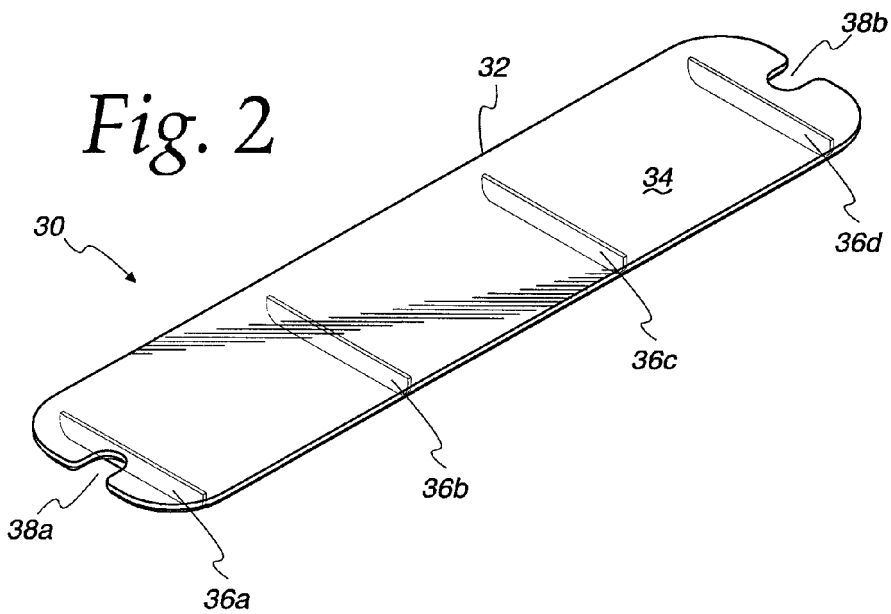
FIG. 2 is a perspective view of another embodiment of the tray insert in accordance with the invention.

Referring to the figures generally, and in particular to FIG. 2, a tray insert 30 according to the present invention is shown generally as having a tray insert body 32. Tray body 32 comprises a supporting surface 34 and a plurality of insert supports 36a-d. Insert supports 36a-d give tray insert 30 height. Supporting surface 34 is a generally flat surface that would support a cooked food portion. Tray body 32 may further comprise at least one finger opening 38a-b. Finger openings 38a-b allow for tray insert 30 to be easily placed into or removed from a food tray. Finger openings 38a-b can be any shape to allow a finger and/or thumb to easily grip tray insert 30. Typically, finger openings 38a-b are semi-circular in shape.

Figure 3:
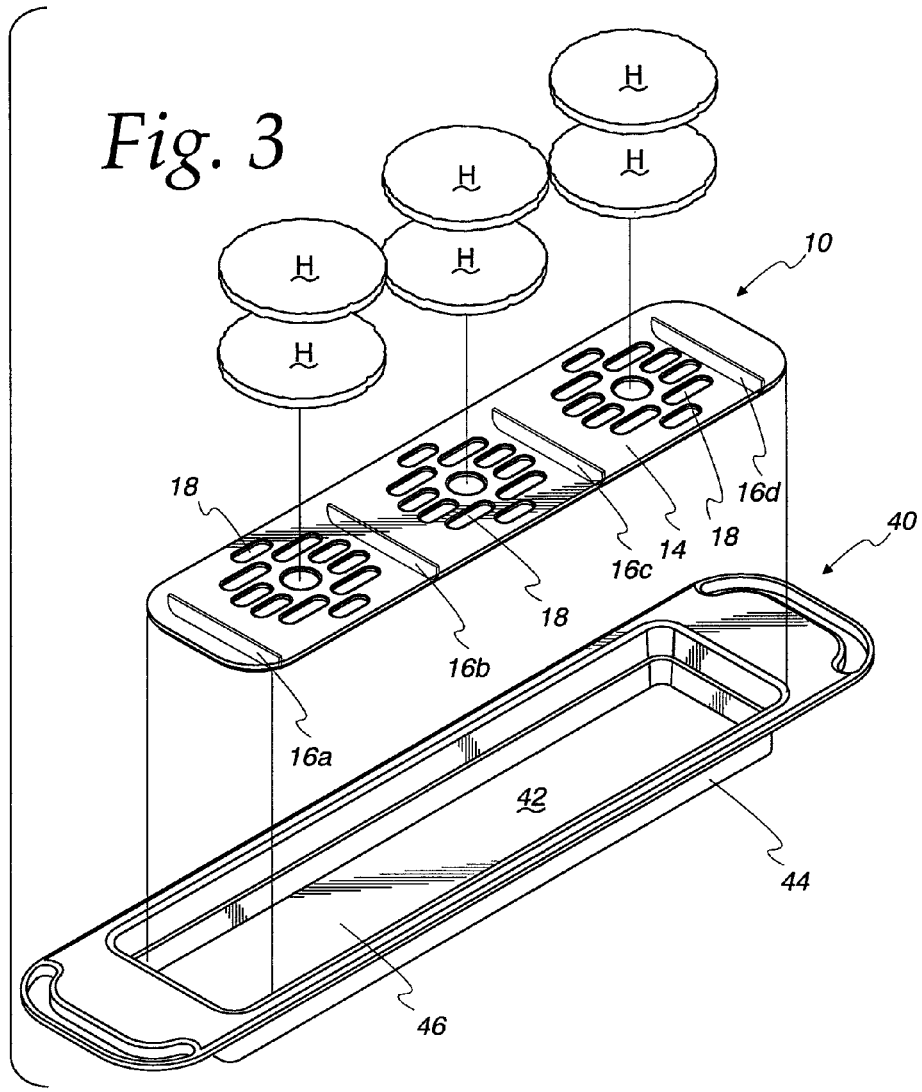
FIG. 3 is a perspective view of an embodiment of the food tray and tray insert in accordance with the invention.
Figure 4:
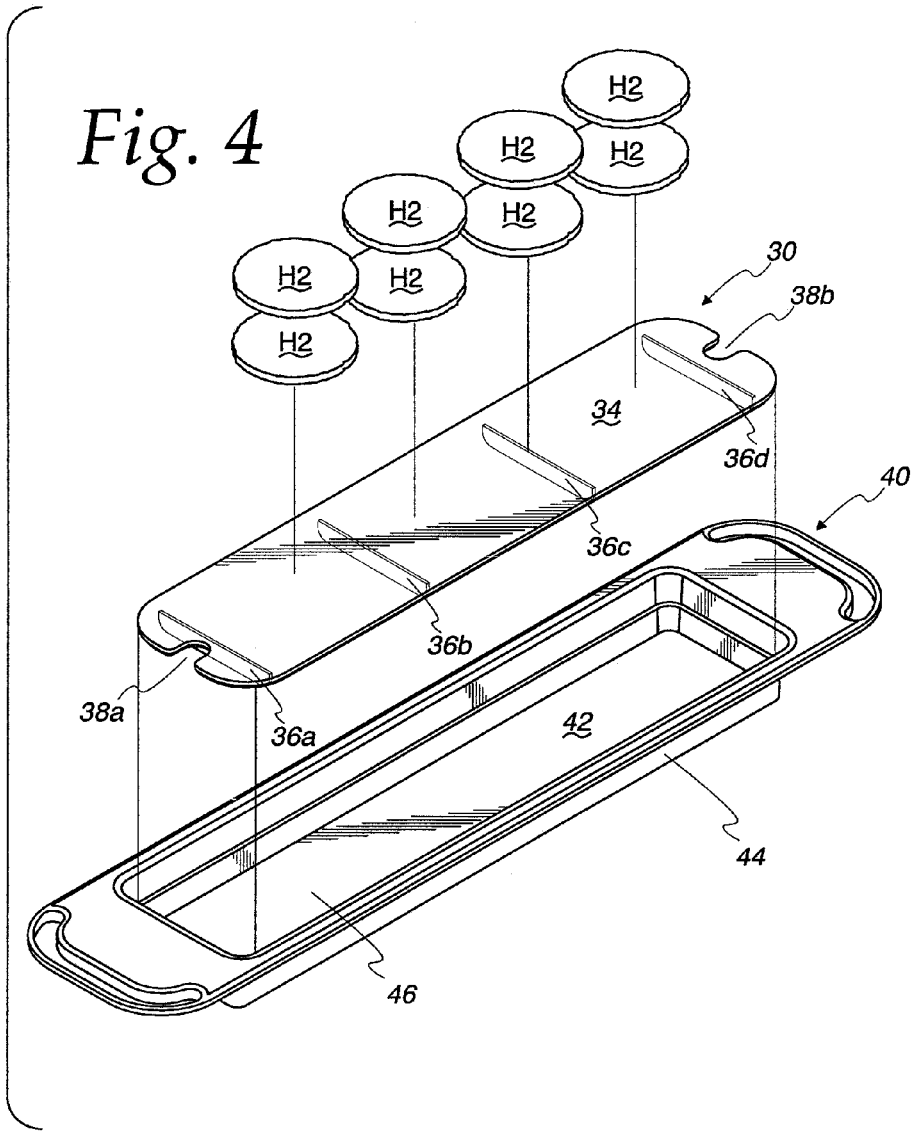
FIG. 4 is a perspective view of another embodiment of the food tray and tray insert in accordance with the invention.

Referring in particular to FIG. 3 and FIG. 4, a food tray 40 is provided according to the present invention and is shown generally as having a tray bottom lower surface 42. Food tray 40 further comprises a sidewall structure 44. Sidewall structure 44 and tray bottom lower surface 42 define a tray volume 46. Tray insert 10 or 30 can be inserted into food tray 40. Hamburger patties H and H2 sit on top of supporting surfaces 14 and 34, respectively.

Figure 5:
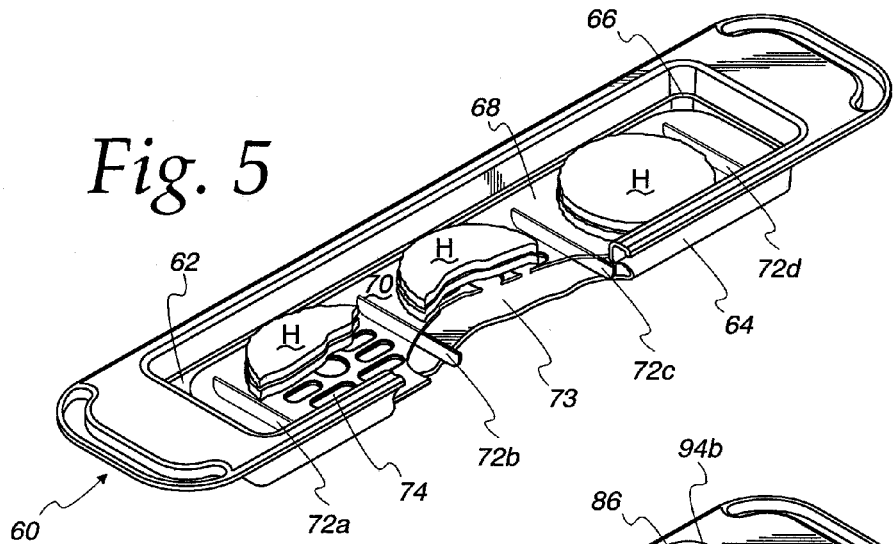
FIG. 5 is a perspective view with a cut-away portion of another embodiment of the food tray and tray insert in accordance with the invention.

Referring in particular to FIG. 5, a food tray 60 is provided according to the present invention and is shown generally as having a lower surface 62. Food tray 60 further comprises a sidewall structure 64. Sidewall structure 64 and lower surface 62 define a tray volume 66. Food tray 60 further comprises a tray insert 68, inserted into food tray 60. Tray insert 68 comprises a supporting surface 70 and insert supports 72a-d. Any number of insert supports can be present as necessary to support tray insert 68. Typically, insert supports 72a-d prevent tray insert 68 from sagging in the middle, keeping supporting surface 70 essentially generally straight. Supporting surface 70 and lower surface 62 define a lower volume 73. Lower volume 73 can be any percentage of tray volume 66 as desired, from about 0% to about 90%. Typically, lower volume 73 is approximately 50% of the overall tray volume.

Tray insert 68 further comprises a plurality of apertures 74. Any number of apertures as desired may be on tray insert 68. The plurality of apertures may be any potential, suitable shape, such as, for example, ovals, circles, slits, or rectangles. Typically, the apertures are arranged in a generally circular shape, such that hamburger patties essentially cover the apertures. Typically, the apertures are arranged to form a generally circular shape approximately the size of a hamburger patty. Typically, the apertures will be essentially completely covered by at least one hamburger patty. Tray insert 68 further comprises a plurality of hamburger patties H located on supporting surface 70 and essentially completely covering apertures 74.

Figure 6:
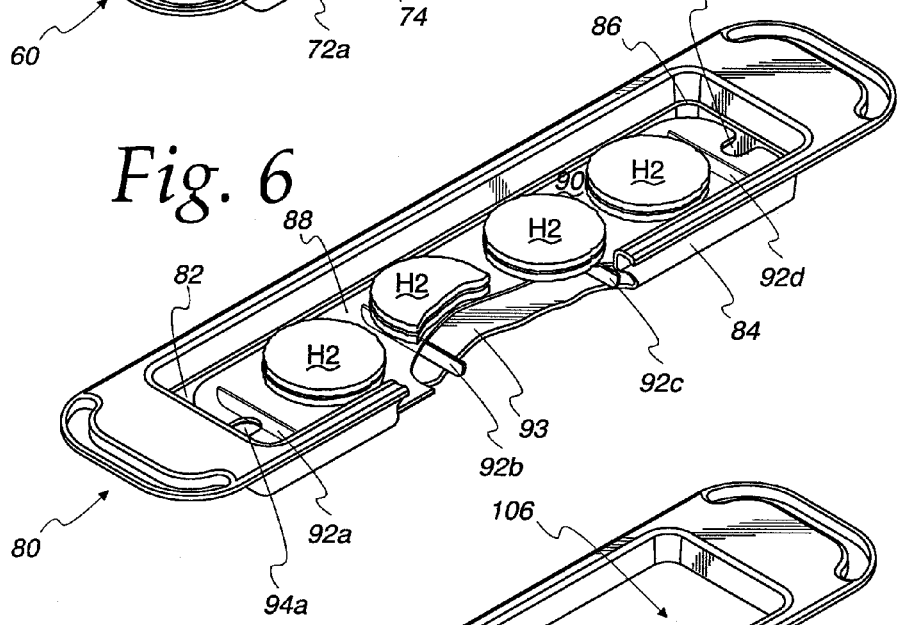
FIG. 6 is a perspective view with a cut-away portion of another embodiment of the food tray and tray insert in accordance with the invention.

Referring in particular to FIG. 6, a food tray 80 is provided according to the present invention and is shown generally as having a lower surface 82. Food tray 80 further comprises a sidewall structure 84. Sidewall structure 84 and lower surface 82 define a tray volume 86. Food tray 80 further comprises a tray insert 88, inserted into food tray 80. Tray insert 88 comprises a supporting surface 90 and insert supports 92a-d. Any number of insert supports can be present as necessary to support tray insert 88. Typically, insert supports 92a-d prevent tray insert 88 from sagging in the middle, keeping supporting surface 90 essentially generally straight. Supporting surface 90 and lower surface 82 define a lower volume 93. Lower volume 93 can be any percentage of tray volume 86 as desired, typically, for example, from about 0% to about 90% of the overall tray volume. Typically, lower volume 93 is approximately 50% of the overall tray volume. Tray insert 88 further comprises finger grips 94a-b on opposite ends of tray insert 88. Finger grips 94a-b allow tray insert 88 to be easily removed from or inserted into food tray 80. Finger grips 94a-b can be any size and shape to facilitate a typical human finger. Typically, the finger grips are semi-circular in shape, as shown in finger grips 94a-b. Tray insert 88 further comprises a plurality of hamburger patties H2 located on supporting surface 90.

Figure 7:
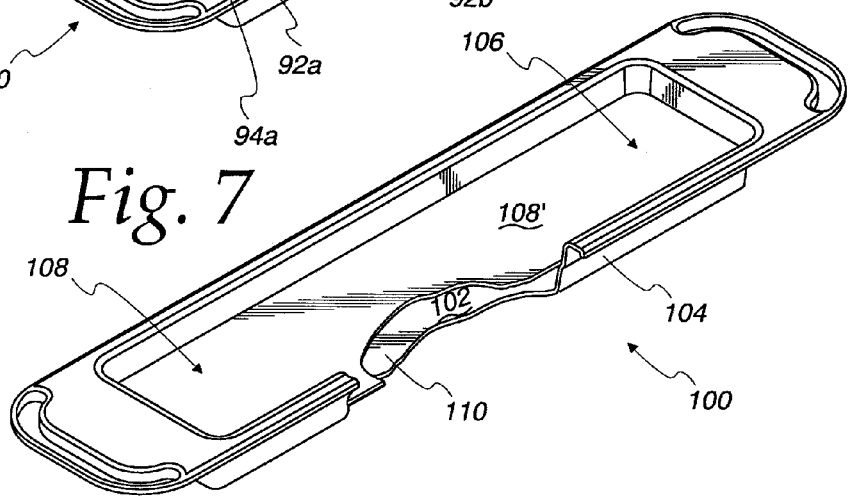
FIG. 7 is a perspective view with a cut-away portion of another embodiment of the food tray in accordance with the invention.

Referring in particular to FIG. 7, a food tray 100 is provided according to the present invention and is shown generally as having a lower surface 102 and supporting sidewalls 104. Lower surface 102 and supporting sidewalls 104 define a tray volume 106. Food tray 100 further comprises an integral tray insert 108. Tray insert 108 is an integral part of food tray 100 and is not removable from food tray 100. Tray insert 108 comprises a supporting surface 108'. Supporting surface 108' of tray insert 108 and lower surface 102 of tray 100 together define a lower volume 110. Lower volume 110 can be any percentage of tray volume 106 as desired, typically, for example, from about 0% to about 90% of the overall tray volume. Typically, lower volume 110 is approximately 50% of the overall tray volume. Lower volume 110 allows supporting surface 108' of tray insert 108 to be elevated above lower surface 102, such that any food portions placed upon supporting surface 108 will not be directly adjacent any heat source contacting lower surface 102. By defining lower volume 110 and not directly contacting any food portions placed on supporting surface 108 with the heated lower surface 102, the food portions can be stored in food tray 100 for extended periods of time.

Figure 8:
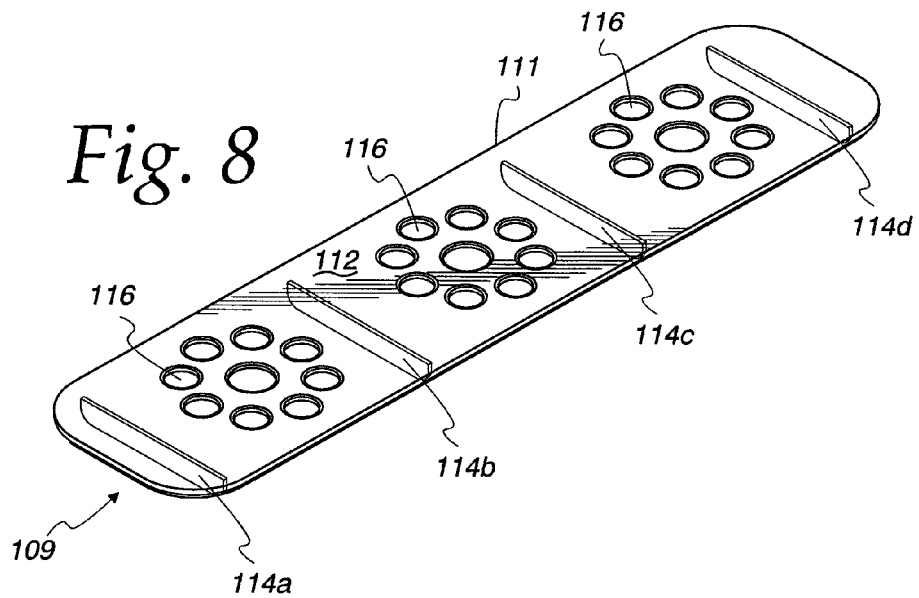
FIG. 8 is a perspective view of another embodiment of the tray insert in accordance with the invention.

Referring to FIG. 8, a tray insert 109 according to the present invention is shown generally as having a tray insert body 111. Tray body 111 comprises a supporting surface 112 and a plurality of insert supports 114a-d. Insert supports 114a-d give tray insert 109 height. Supporting surface 112 is an essentially generally flat surface. Supporting surface 112 further comprises a plurality of apertures 116 to form a generally circular shape generally corresponding to the diameter or footprint of cooked food portions to be stored thereon. Apertures 116 are generally circular in shape as appropriate for the cooked food that will be stored on supporting surface 112 and form an overall generally circular shape approximately the size and shape of a hamburger patty. Typically, apertures 116 define a total void space opening of at least 30%. More typically, apertures 116 define a total void space opening of at least 50%.

Figure 9:
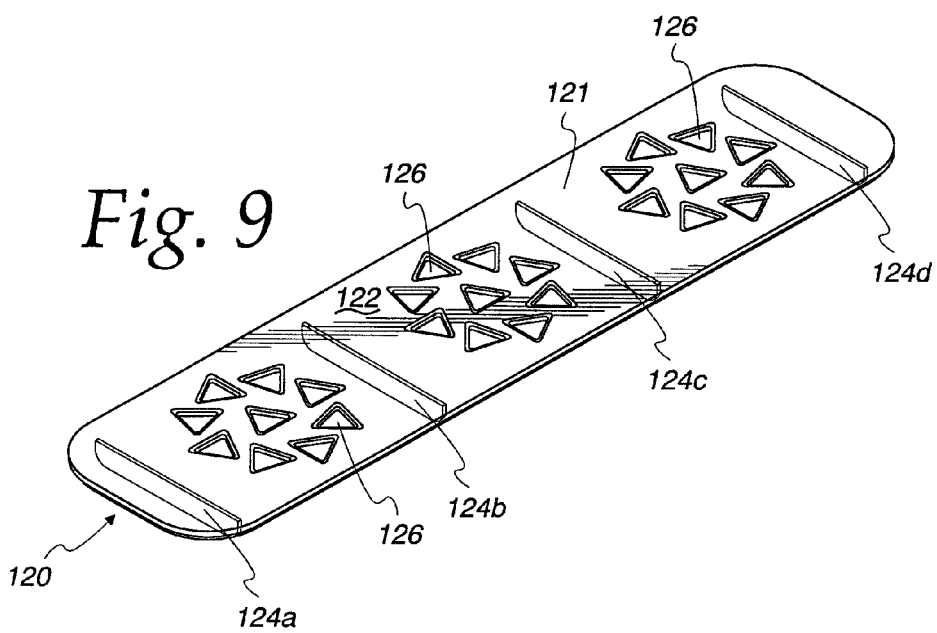
FIG. 9 is a perspective view of another embodiment of the tray insert in accordance with the invention.

Referring to FIG. 9, a tray insert 120 according to the present invention is shown generally as having a tray insert body 121. Tray body 121 comprises a supporting surface 122 and a plurality of insert supports 124a-d. Insert supports 124a-d give tray insert 120 height. Supporting surface 122 is an essentially generally flat surface. Supporting surface 122 further comprises a plurality of apertures 126 to form a generally circular shape generally corresponding to the size of the cooked food portions to be stored thereon. Apertures 126 are generally triangular in shape as appropriate for the cooked food that will be stored on supporting surface 122 and form an overall generally circular shape approximately the size and shape of a hamburger patty. Typically, apertures 126 define a total void space opening of at least 30%. More typically, apertures 126 define a total void space opening of at least 50%.

Referring to FIG. 13, a tray body 180 is provided. Tray body 180 comprises a tray bottom lower surface 182 and supporting sidewalls 183. Lower surface 182 and supporting sidewalls 183 define a tray volume 184. Tray body 180 further comprises finger grips 186a-b. Individual food portions 188a-f are contained within food tray 180, located on lower surface 182. Tray body 180 has an overall height X. Individual food portions have a food portion height Y. Food portion height Y can be any height equal to or less than overall height X. Typically, food portion height Y is one half of overall height X.

Referring to FIG. 14, a tray body 200 is provided. Tray body 200 comprises supporting sidewalls 202, a lower surface 203, and tray legs 204. Lower surface 203 and tray legs 204 further define a lower volume 205. Tray body 200 further comprises finger grips 206a-b. Lower surface 203 and supporting sidewalls 202 further define a tray volume 208. Individual food portions 210a-f are located on lower surface 203 within tray volume 208. Tray body 200 is resting on a lower compartment surface 212. Lower volume 205 is further bound and defined by lower compartment surface 212. Lower volume 205 has a supporting surface height Z. Height Z can be any suitable height to prevent direct contact of lower surface 203 with lower compartment surface 212.

Figure 10:
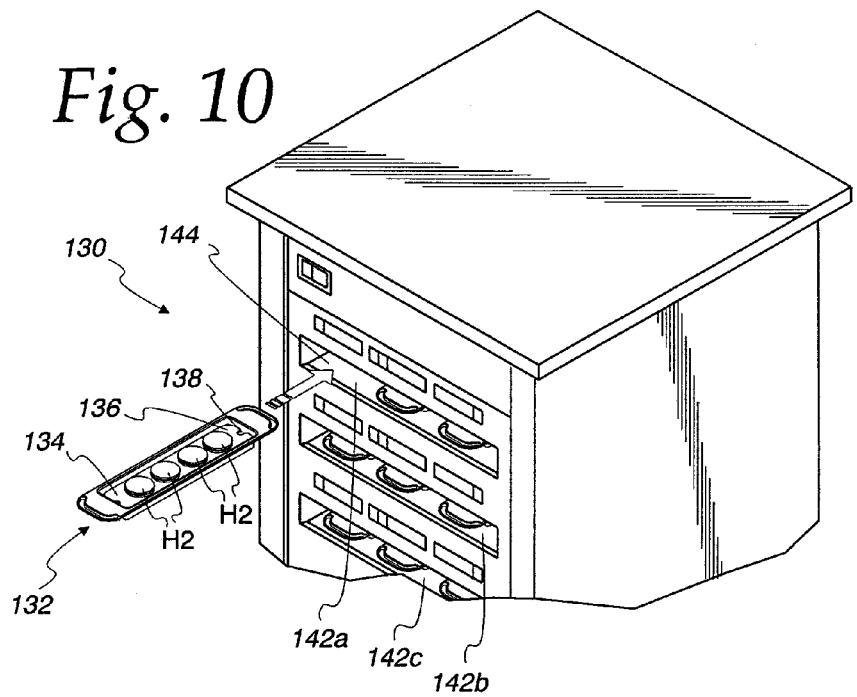
FIG. 10 is a perspective view of a method of using the food tray and tray insert in accordance with the invention.

Referring to FIG. 10, a method of storing individual portions of food is provided. A universal holding cabinet 130 is provided to store individual portions of food. A food tray 132 is provided. Food tray 132 comprises a tray insert 134 that is elevated above the lower surface of food tray 132. Tray insert 134 comprises a supporting surface 136 and finger grips 138.

Supporting surface 136 allows for the storage and placement of individual portions of food H2. Individual portions of food H2 are placed on supporting surface 136. Food tray 132 is inserted into one of heated compartments 142a-c in universal holding cabinet 130. Heated compartments 142a-c comprise a heated lower compartment surface 144. Food tray 132 is stored in one of heated compartments 142a-c for a period of time, maintaining the temperature of the cooked food products in a desired elevated storage temperature range.

Figure 11:
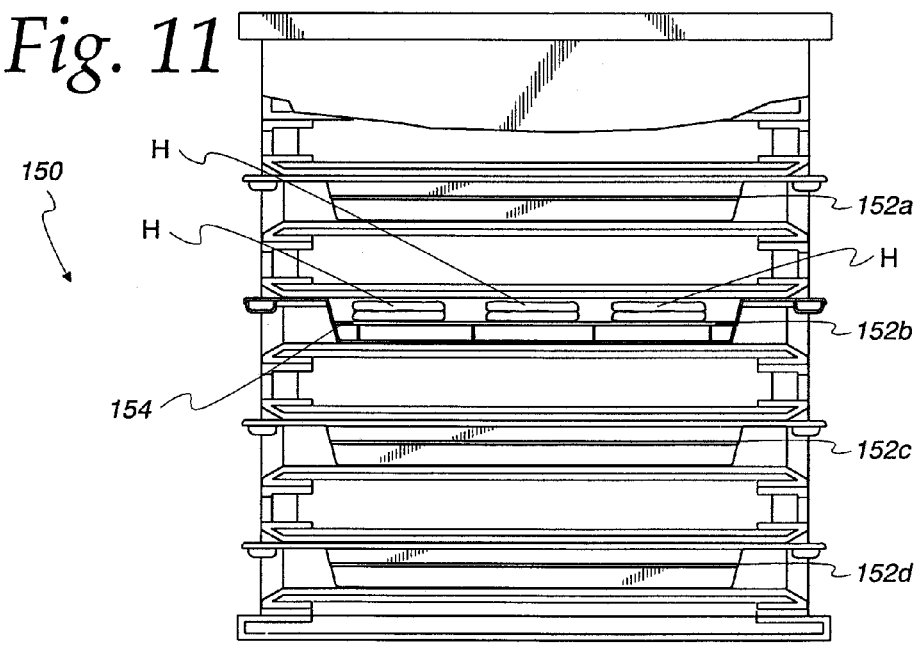
FIG. 11 is a perspective view of another embodiment of the method of using the food tray and tray insert in accordance with the invention.

Referring to FIG. 11, a method of storing previously cooked hamburger patties after cooking and before incorporation into a hamburger sandwich is provided. A universal holding cabinet 150 is provided to store individual portions of food. Food trays 152a-d are provided. Universal holding cabinet 150 is a pass-through design, allowing food trays 152a-d to be inserted into and removed from either side of universal holding cabinet 150. Food trays 152a-d further comprise supporting surface 154. Individual hamburger patties H are placed upon supporting surface 154 and inside food tray 152b.

Figure 12:
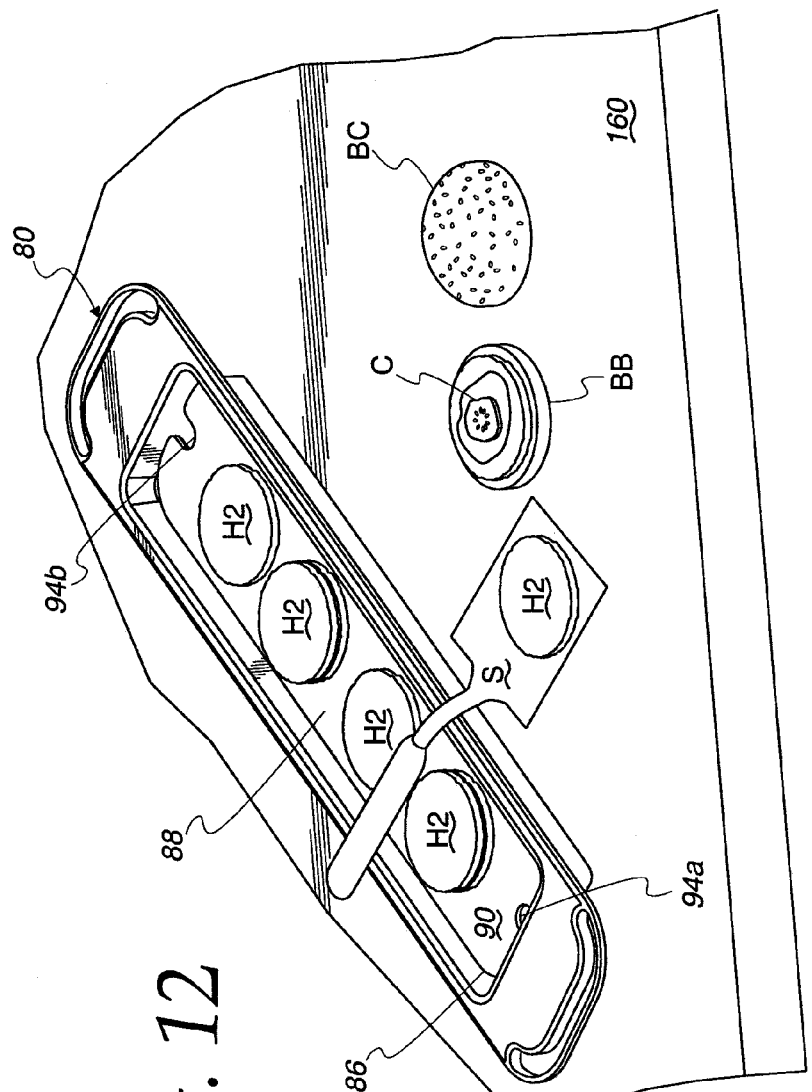
FIG. 12 is a perspective view of a method of making a sandwich in accordance with the invention.

Referring to FIG. 12, a method of making a hamburger sandwich is provided. Food tray 80 is provided which comprises tray volume 86 and tray insert 88. Tray insert 88 further comprises supporting surface 90 and finger grips 94a-b. Hamburger patties H2 are supported upon supporting surface 90. Hamburger patty H2 is on spatula S and is removed from food tray 80. Preparation of the hamburger sandwich occurs in work space 160. The hamburger patties H2 are assembled into hamburger sandwiches by applying condiments C and a bottom bun BB and a bun cap BC. Bottom bun BB, bun cap BC, condiments C, and hamburger patty H2 are placed together to prepare a hamburger sandwich.

While the invention has been described with respect to certain preferred embodiments, as will be appreciated by those skilled in the art, it is to be understood that the invention is capable of numerous changes, modifications and rearrangements, and such changes, modifications and rearrangements are intended to be covered by the following claims.

What is claimed is:

1. A method of storing individual portions of previously cooked food items comprising:
    providing a food tray having an open top comprising a tray body having a first end and a second end, a lower surface and a sidewall structure defining a tray height and a tray volume within said tray body, and a removable tray insert positionable in the tray volume and comprising an elongated supporting surface and insert supports defining a tray insert height, wherein said supporting surface is above said lower surface and below the top of the sidewall structure, and wherein said tray insert height is at least about 0.2125 inches, the supporting surface having a plurality of spaced apart apertures extending therethrough, the apertures providing a void space in the supporting surface area of at least about 30%;
    wherein said lower surface defines a lower volume between said lower surface and said supporting surface, and the supporting surface defines a food holding volume in conjunction with said sidewall structure for storing food items completely contained in the food holding volume, wherein the lower volume is between 10% and about 80% of the tray volume; and
    placing the individual portions of previously cooked food items on said supporting surface so that each of the individual portions of food items are completely contained in the food holding volume and so that all of the spaced apart apertures are covered by the individual portions of food items;
    placing and storing for a period of time the tray having the individual portions of previously cooked food items therein in a heated compartment having an upper compartment surface and a heated lower compartment surface to maintain the temperature of the cooked food items in a desired elevated storage temperature range, wherein said supporting surface is elevated above said heated lower compartment surface; and
    maintaining the tray during said storing so that the top edge of the tray is between about 0 and 0.25 inches from the upper compartment surface;
    wherein said gap is sufficiently sized to restrict water vapor from evaporating from the cooked food in the tray and from leaving the tray volume during storage in the compartment.

2. The method of claim 1 wherein said supporting surface comprises a plurality of spaced apart apertures.

3. The method of claim 1 wherein the combined area of the apertures is at least about 30% of the area of the supporting surface.

4. The method of claim 3 wherein said apertures comprise oval apertures.

5. The method of claim 1 wherein said lower volume avoids significant convection heat transfer between said heated lower compartment surface and said individual portions of cooked food items.

6. A method of storing previously cooked hamburger patties after cooking and before incorporation into a hamburger sandwich comprising:
    providing a food tray having an open top comprising a tray body having a first end and a second end, a lower surface and a sidewall structure defining a tray height and a tray volume within said tray body, and a tray insert positionable in the tray volume and comprising an elongated supporting surface and insert supports defining a tray insert height at least about 0.2125 inches, wherein said supporting surface is above said lower surface and below the top of the sidewall structure, and said lower surface defines a lower volume between said lower surface and said supporting surface, wherein the lower volume is between about 10% and about 80% of the tray volume, and the supporting surface defines a food holding volume in conjunction with said sidewall structure for storing food items completely contained in the food holding volume, the supporting surface having a plurality of at least generally circular aperture-containing areas and the approximate size of the hamburger patties to be stored, the apertures providing a void space in the area of the supporting surface of at least 30%;
    placing the previously cooked hamburger patties on said supporting surface so that each of the hamburger patties is completely contained in the food holding volume and that each aperture-containing area is covered by a separate one of said hamburger patties;
    placing and storing for a desired period of time the tray having the cooked hamburger patties therein in a heated compartment having an upper surface and a heated lower compartment surface, to maintain a storage temperature of the cooked hamburger patties at about 145° F. or more; and
    maintaining the tray during said storing so that the top edge of the tray is between about 0 and 0.25 inches from the upper surface to restrict water vapor from evaporating from the cooked hamburger patties in the tray and from leaving the tray volume during storage in the compartment.

7. The method according to claim 6 wherein each of said aperture-containing areas comprises a plurality of spaced apart apertures.

8. The method according to claim 7 wherein said apertures are in an at least generally circular area, the circular area generally corresponding to the size of hamburger patties to be stored thereon.

9. The method according to claim 7 wherein said lower volume is about equal to the food holding volume.

10. The method according to claim 6 further comprising continuing the storage of the hamburger patties in the tray until the hamburger patties are assembled into hamburger sandwiches.

11. The method according to claim 6 wherein said hamburger patties are stacked two high.

12. The method according to claim 11 wherein eight hamburger patties are stored in said tray.

13. The method according to claim 11 wherein six hamburger patties are stored in said tray.

14. A method of making a hamburger sandwich comprising:

cooking a plurality of hamburger patties;

providing a food tray having an open top comprising a tray body having a first end and a second end, a lower surface and a sidewall structure defining a tray height and a tray volume within said tray body, and a tray insert positionable in the tray volume and comprising an elongated supporting surface and insert supports defining a tray insert height at least about 0.2125 inches, wherein said supporting surface is above said lower surface and below the top of the sidewall structure, and said lower surface defines a lower volume between said lower surface and said supporting surface, wherein the lower volume is between about 10% and about 80% of the tray volume, and the supporting surface defines a food holding volume in conjunction with said sidewall structure for storing food items completely contained in the food holding volume and the supporting surface has a plurality of spaced apart apertures extending therethrough, the apertures providing a void space in the supporting surface of at least about 30%;

placing the previously cooked hamburger patties on said supporting surface so that each of the hamburger patties is completely contained in the food holding volume and covers the supporting surface apertures;

placing and storing for a desired period of time the tray having the cooked hamburger patties therein in a heated compartment having an upper surface and a heated lower compartment surface, to maintain a storage temperature of the cooked hamburger patties at about 145° F. or more;

maintaining the tray during said storing so that there is between about 0 and 0.25 inches between the top edge of the tray and the upper surface to restrict water vapor from evaporating from the cooked hamburger patties wholly contained in the food storage volume of the tray during storage in the compartment;

thereafter removing cooked hamburger patties from the tray when needed for assembly into hamburger sandwiches; and assembling the hamburger patties into hamburger sandwiches.

15. The method according to claim 14 wherein the assembling includes applying condiments and placing the hamburger patties into buns.

16. The method according to claim 14 wherein said supporting surface comprises a plurality of circular arrays of spaced apart apertures.

17. The method according to claim 14 wherein said hamburger patties are stacked two high.

18. The method according to claim 17 wherein said lower volume is about equal to the food holding volume.

19. The method according to claim 17 wherein six hamburger patties are stored in said tray.

20. The method of claim 1 wherein the tray insert is an integral part of the tray body.

21. The method of claim 20 wherein the volume between the lower surface and the supporting surface is a sealed void.

22. The method of claim 16 further comprising a plurality of cooked hamburger patties contained in the tray and at least substantially covering the apertures with the hamburger patties.

23. The method of claim 14 wherein the tray insert is an integral part of the tray body.

24. The method of claim 23 wherein the volume between the lower surface and the supporting surface is a sealed void.

* * * * *